United States Patent
Bai et al.

(10) Patent No.: US 9,210,726 B2
(45) Date of Patent: Dec. 8, 2015

(54) RANDOM ACCESS METHOD AND DEVICE IN COGNITIVE RADIO SYSTEM

(75) Inventors: Wenling Bai, Beijing (CN); Zhuo Gao, Beijing (CN); Chenggang Jiang, Beijing (CN); Yuanyuan Li, Beijing (CN); Yu Yang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 14/365,202

(22) PCT Filed: Sep. 11, 2012

(86) PCT No.: PCT/CN2012/081252
§ 371 (c)(1),
(2), (4) Date: Jun. 26, 2014

(87) PCT Pub. No.: WO2013/086874
PCT Pub. Date: Jun. 20, 2013

(65) Prior Publication Data
US 2014/0328325 A1 Nov. 6, 2014

(30) Foreign Application Priority Data
Dec. 14, 2011 (CN) .......................... 2011 1 0418518

(51) Int. Cl.
*H04W 4/00* (2009.01)
*H04W 74/08* (2009.01)
(Continued)

(52) U.S. Cl.
CPC ...... *H04W 74/0833* (2013.01); *H04W 36/0055* (2013.01); *H04W 36/0077* (2013.01); *H04W 36/04* (2013.01); *H04W 74/008* (2013.01); *H04B 2201/692* (2013.01); *H04W 74/085* (2013.01)

(58) Field of Classification Search
CPC .......... H04W 74/0833; H04W 74/008; H04W 74/085; H04W 36/04; H04W 36/0077; H04W 36/0055; H04B 2201/692
USPC ........... 370/331, 335, 338, 252; 455/436, 439
See application file for complete search history.

(56) References Cited

U.S. PATENT DOCUMENTS

| 6,597,675 B1 * | 7/2003 | Esmailzadeh et al. ........ 370/335 |
| 2007/0047493 A1 | 3/2007 | Park et al. |

(Continued)

FOREIGN PATENT DOCUMENTS

| CN | 1505336 A | 6/2004 |
| CN | 101616488 A | 12/2009 |

(Continued)

OTHER PUBLICATIONS

International Search Report for PCT/CN2012/081252, ISA/CN, Beijing, mailed Dec. 20, 2012.
(Continued)

*Primary Examiner* — Kwang B Yao
*Assistant Examiner* — Harun Chowdhury
(74) *Attorney, Agent, or Firm* — Harness, Dickey & Pierce, P.L.C.

(57) ABSTRACT

Various examples of the present disclosure describe a random access method and device in a CR system. The method includes: generating, by a base station device, a spectrum handover command, wherein the spectrum handover command comprises random access backoff time parameter information; and sending, by the base station device, the spectrum handover command to a user equipment in a cell to instruct the UE to initiate, during a spectrum handover procedure, a random access procedure using the random access backoff time parameter information. According to the various examples of the present disclosure, the random access backoff time parameter information is carried in the spectrum handover command, so that a random access conflict is suppressed during the spectrum handover procedure of the CR system. A large number of UEs that intensively perform random access on a target working frequency are pre-dispersed in time. As such, the delay and the failure probability of the random access on the target working frequency during the spectrum handover procedure are reduced, and thus the failure probability of the spectrum handover and the service interruption time are reduced, so that the user experience of the CR system is improved.

14 Claims, 3 Drawing Sheets

(51) Int. Cl.
*H04W 36/00* (2009.01)
*H04W 74/00* (2009.01)
*H04W 36/04* (2009.01)

(56) References Cited

U.S. PATENT DOCUMENTS

| | | | |
|---|---|---|---|
| 2009/0180443 A1* | 7/2009 | Kawasaki et al. | 370/331 |
| 2009/0310579 A1* | 12/2009 | Furuta | 370/338 |
| 2010/0040022 A1* | 2/2010 | Lindstrom et al. | 370/331 |
| 2010/0232364 A1 | 9/2010 | Hsu | |
| 2011/0141969 A1 | 6/2011 | Sridhara et al. | |

FOREIGN PATENT DOCUMENTS

| | | |
|---|---|---|
| CN | 101702635 A | 5/2010 |
| CN | 101841923 A | 9/2010 |
| CN | 102196452 A | 9/2011 |

OTHER PUBLICATIONS

Chinese Office Action for Application No. 2011104185183 dated Dec. 31, 2014, and its English translation thereof.
European Search Report for Application No. 12856870.6, dated Nov. 5, 2014.
Nokia et al. "Handover Command and UE Behavior." 3rd Generation Partnership Project (3GPP), Mobile Competence Centre; Aug. 15, 2007.
Motorola "Load Control of Non-Contention Based RACH." 3rd Generation Partnership Project (3GPP), Mobile Competence Centre; Feb. 5, 2008.
3rd Generation Partnership Project; Technical Specification Group Radio Access Network; Evolved Universal Terrestrial Radio Access (E-Utra) and Evolved Universal Terrestrial Radio Access Network; Jun. 22, 2011.

* cited by examiner

RANDOM ACCESS METHOD AND DEVICE IN COGNITIVE RADIO SYSTEM

CROSS-REFERENCE TO RELATED APPLICATIONS

This application is a 371 National Phase of International Application number PCT/CN2012/081252, filed on Sep. 11, 2012, which claims the priority of a Chinese patent application No. 201110418518.3, filed Dec. 14, 2011, entitled "RANDOM ACCESS METHOD AND DEVICE IN COGNITIVE RADIO SYSTEM", the entire disclosures of the previous applications are incorporated herein by reference.

FIELD

Examples of the present disclosure relate to communication technologies, and more particularly, to a random access method and device in a cognitive radio (CR) system.

BACKGROUND

With rapid development of wireless communication technologies, spectrum resources are increasingly scarce. By monitoring and studying wireless communication spectrums, it is found that some bands (such as a television band) are not used in most of time or not used within most areas, while multi-user or multi-system competition occurs in some other bands. In other words, the use of the spectrum resources is imbalanced. CR technology emerges under this background. The basic principle of CR is described as follows. Under the premise of not disturbing an authorization system and by monitoring changes of current wireless communication environment, white space spectrums of the authorization system are accessed, in the form of the dynamic opportunistic spectrum access, for communications.

The premise of opportunistically accessing, by a CR system, the white space spectrums of the authorization system is that services of the authorization system are not disturbed by the CR system. Based on this requirement: (1) the CR system may have a capability of accurately determining the white space spectrums of the authorization system; (2) the CR system may have a spectrum handover capability, i.e., when the CR system detects that the authorization system appears on a white space spectrum currently used (i.e., a source working frequency), the CR system may promptly exit from the white space spectrum currently used. In order to ensure the business continuity of the CR system, during the spectrum handover, when the CR system exits from the source working frequency, the CR system is handed over to another white space spectrum (i.e., a target working frequency) for reestablishing services.

FIG. 1 is a schematic diagram illustrating a method for implementing the spectrum handover in the CR system. As shown in FIG. 1, a based station sends a spectrum handover command to a user equipment (UE) to notify the UE to stop data transmitting and receiving on the source working frequency and reestablish a cell on the target working frequency. When receiving the spectrum handover command, the UE leaves the source working frequency and performs downlink synchronization with the target working frequency. When the downlink synchronization with the target working frequency is completed, the UE performs a random access procedure on the target working frequency, so as to perform uplink synchronization with the base station through the random access procedure. Specifically, the UE sends a random access preamble to the base station and the base station sends a random access response to the UE. The UE sends a spectrum handover completing message to the base station and the base station sends a competition solving message to the UE. In addition, after the random access procedure is completed, the spectrum handover is completed.

During the spectrum handover procedure of the CR system, UEs in a connection state within the cell are handed over to the target working frequency. As such, all of the UEs in the connection state initiate the random access procedure on the target working frequency within a short period, which causes a serious random access conflict.

During the process of implementing various examples of the present disclosure, the inventors find that the prior art at least has disadvantages described as follows. During the spectrum handover procedure of the CR system, there is not a reasonable solution for solving the random access conflict, which results in a higher failure probability of the spectrum handover and long service interruption time. Moreover, users at different service levels could not be processed distinguishingly, so that user experience of the CR system is influenced.

SUMMARY

Various examples of the present disclosure describe a random access method and device in the CR system, which can suppress a random access conflict.

Examples of the present disclosure describe a random access method in a CR system. The method includes:
generating, by a base station device, a spectrum handover command,
   wherein the spectrum handover command comprises random access backoff time parameter information; and
   sending, by the base station device, the spectrum handover command to a user equipment (UE) in a cell to instruct the UE to initiate, during a spectrum handover procedure, a random access procedure using the random access backoff time parameter information.

Examples of the present disclosure describe a random access method in a CR system. The method includes:
receiving, by a user equipment (UE), a spectrum handover command sent from a base station device,
   wherein the spectrum handover command comprises random access backoff time parameter information; and
   initiating, by the UE during a spectrum handover procedure, a random access procedure using the random access backoff time parameter information.

Examples of the present disclosure describe a base station device, which includes:
a generating module, to generate a spectrum handover command;
   wherein the spectrum handover command comprises random access backoff time parameter information; and
   a sending module, to send the spectrum handover command to a user equipment (UE) in a cell to instruct the UE to initiate, during a spectrum handover procedure, a random access procedure using the random access backoff time parameter information.

Examples of the present disclosure describe a user equipment (UE), which includes:
a receiving module, to receive a spectrum handover command sent from a base station device;
   wherein the spectrum handover command comprises random access backoff time parameter information; and
   a processing module, to initiate, during a spectrum handover procedure, a random access procedure using the random access backoff time parameter information.

Compared with the prior art, various examples of the present disclosure at least have advantages described as follows. The random access backoff time parameter information is carried in the spectrum handover command, so that the random access conflict is suppressed during the spectrum handover procedure of the CR system. A large number of UEs that intensively perform random access on the target working frequency are pre-dispersed in time. As such, the delay and the failure probability of the random access on the target working frequency during the spectrum handover procedure are reduced, and thus the failure probability of the spectrum handover and the service interruption time are reduced, so that the user experience of the CR system is improved. In addition, by providing random backoff modes based on different service levels, the service interruption time of a user with a higher priority is reduced during the spectrum handover procedure, and thus the user experience of the user with the higher priority in the CR system is improved.

BRIEF DESCRIPTION OF DRAWINGS

Hereinafter, accompanying drawings used for describing examples of the present disclosure may be briefly introduced to make the technical solution of the present disclosure clearer. Obviously, the drawings described below may be some example embodiments of the present disclosure. Those skilled in the art may also obtain other drawings without making creative efforts according to the accompanying drawings in which.

DETAILED DESCRIPTION

Hereinafter, the present disclosure will be described in further detail with reference to the accompanying drawings and examples. Obviously, the example embodiments described herein are selected embodiments and not all possible implementations. Based on the examples of the present disclosure, those skilled in the art may still make various modifications or variations without making creative efforts. Such modifications and variations shall fall within the protection scope of the example embodiments, as defined in attached claims.

The first example of the present disclosure describes a random access method in a CR system, which is associated with a random access procedure initiated during a spectrum handover procedure. The random access method may at least be applied to mobile communication systems employing the CR technology such as LTE (Long Term Evolution), TD-SCDMA (Time Division-Synchronous Code Division Multiple Access), HSPA (High-Speed Packet Access), CDMA (Code Division Multiple Access)-2000, WCDMA (Wideband Code Division Multiple Access), GSM (Global System for Mobile Communications), and etc.

Figure 1:
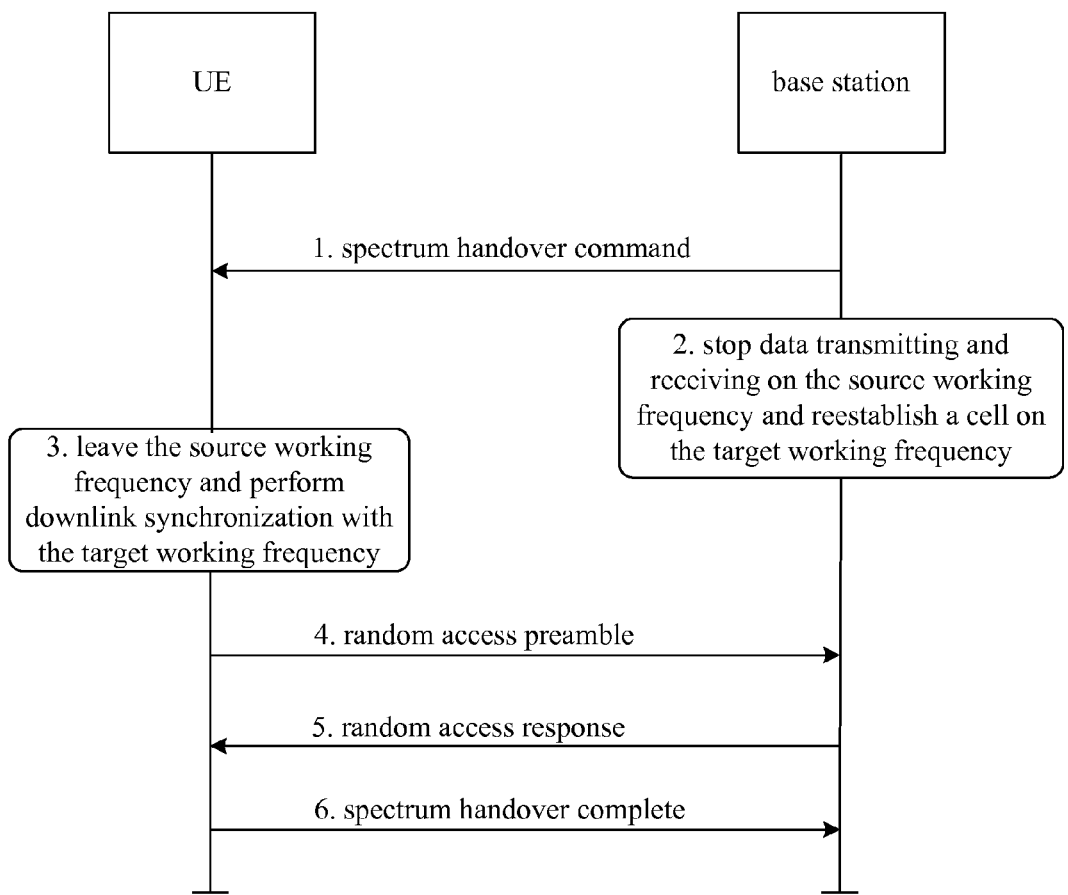
FIG. 1 is a flowchart illustrating a method for implementing spectrum handover in the prior art, according to an example of the present disclosure.
Figure 2:
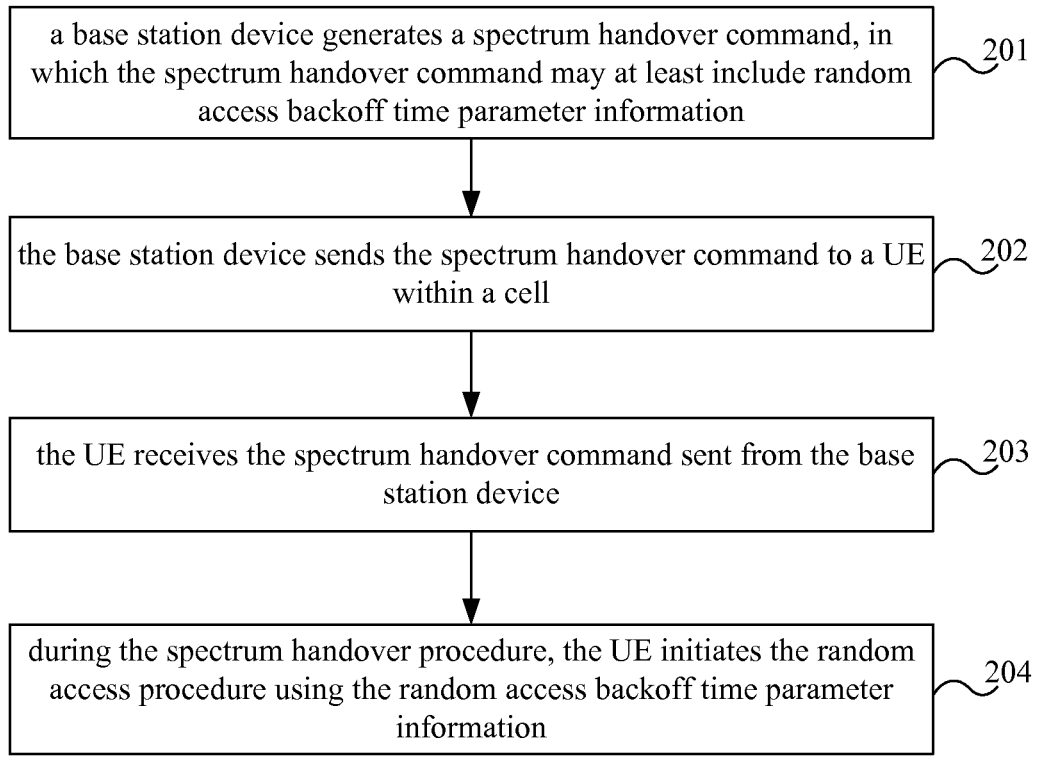
FIG. 2 is a flowchart illustrating a random access method in a CR system, according to a first example of the present disclosure.

As shown in FIG. 2, the random access method in the CR system may include following operations.

In block 201, a base station device (the base station device is a base station device based on the CR system) may generate a spectrum handover command, in which the spectrum handover command may at least include random access backoff time parameter information. In addition, the spectrum handover command may at least further include a target working frequency and radio resource configuration information.

According to an example of the present disclosure, when the base station device detects that a user of an authorization system appears on a current working frequency (i.e., a source working frequency, which is a white space spectrum currently used), the base station device may determine that a spectrum handover procedure is to be performed and may generate the spectrum handover command. Alternatively, according to another example of the present disclosure, when the base station device detects that a channel quality of the current working frequency is less than a predetermined threshold (i.e., the channel quality of the current working frequency is degraded), the base station device may determine that the spectrum handover procedure is to be performed and may generate the spectrum handover command.

In block 202, the base station device may send the spectrum handover command to a UE (the UE is a UE based on the CR system) within a cell, so as to instruct the UE to initiate, during the spectrum handover procedure, the random access procedure using the random access backoff time parameter information. In this case, the spectrum handover command may at least include the target working frequency, the radio resource configuration information, and the random access backoff time parameter information.

According to an example of the present disclosure, when the base station device sends the spectrum handover command to the UE, the base station device may stop data transmitting and receiving on the source working frequency. And, after the data transmitting and receiving on the source working frequency is stopped, the base station device may reestablish the cell using the target working frequency.

According to an example of the present disclosure, during the process of generating the spectrum handover command, the base station device may determine the number of sending the spectrum handover command. During the process of sending the spectrum handover command, the base station device may send the spectrum handover command in accordance with the determined number. For example, when the determined number is 3, the base station device may send the spectrum handover command three times.

In block 203, the UE may receive the spectrum handover command from the base station device, in which the spectrum handover command may at least include the target working frequency, the radio resource configuration information, and the random access backoff time parameter information.

In block 204, during the spectrum handover procedure, the UE may initiate the random access procedure using the random access backoff time parameter information. According to an example of the present disclosure, the UE may initiate the random access procedure using the random access backoff time parameter information according to a following way. Specifically, the UE may determine random access backoff time using the random access backoff time parameter information, and may initiate the random access procedure after the random access backoff time.

According to an example of the present disclosure, the UE may determine the random access backoff time using the random access backoff time parameter information and may initiate the random access procedure after the random access backoff time according to a following way. When receiving the spectrum handover command sent from the base station device, the UE may perform downlink synchronization with the target working frequency. When the downlink synchronization with the target working frequency is completed, the UE may determine the random access backoff time using the random access backoff time parameter information. When the random access backoff time is determined, the UE may initiate the random access procedure after the random access backoff time. Alternatively, according to another example of the present disclosure, when receiving the spectrum handover command sent from the base station device, the UE may determine the random access backoff time using the random access backoff time parameter information. When the random access backoff time is determined, the UE may perform the downlink synchronization with the target working frequency. When the downlink synchronization with the target working frequency is completed, the UE may initiate the random access procedure after the random access backoff time.

According to an example of the present disclosure, when the downlink synchronization with the target working frequency is performed firstly, during the spectrum handover procedure, the UE may initiate the random access procedure using the random access backoff time parameter information according to a way described as follows. When receiving the spectrum handover command, the UE may exit from the source working frequency and perform the downlink synchronization with the target working frequency. Meanwhile, when receiving the spectrum handover command, the UE may calculate the random access backoff time ($T_{BI}$) using the random access backoff time parameter information included in the spectrum handover command. After the UE waits for the random access backoff time, the UE may initialize the random access procedure of the target working frequency. Thereafter, the UE may send, on the target working frequency, a random access preamble to the base station device. When receiving the random access preamble sent from the UE, the base station device may send a random access response to the UE. When receiving the random access response, the UE may send a spectrum handover completing message to the base station device.

According to an example of the present disclosure, the random access backoff time parameter information may include but not limited to a maximum random access delay factor applied to all of UEs in the cell, or, a random access delay factor sequence associated with service levels of different UEs in the cell. According to an example of the present disclosure, the random access delay factor sequence may be presented as $T_1, T_2, T_{i-1}, T_i \ldots T_M$, in which M is the total number of the service levels, $T_i$ is a maximum random access delay factor of the i-th service level, and $T_i$ is a minimum random access delay factor of the (i+1)-th service level.

It should be noted that the random access delay factor sequence may not carry $T_0$. The base station device and the UE may regard $T_0$ as 0 by default.

According to an example of the present disclosure, under a first situation, when the random access backoff time parameter information is the maximum random access delay factor applied to all of the UEs in the cell, an information field of the spectrum handover command may be shown as in Table 1.

TABLE 1

| information field | the number of bits of the information |
|---|---|
| the target working frequency | n1 bit |
| radio resource configuration information of the target working frequency | n2 bit |

TABLE 1-continued

| information field | the number of bits of the information |
|---|---|
| the maximum random access delay factor applied to all of the UEs in the cell | n3 bit |

When the random access backoff time parameter information is the maximum random access delay factor applied to all of the UEs in the cell, the UE may determine the random access backoff time using the random access backoff time parameter information according to a following way. The UE may randomly select the random access backoff time according to a uniform distribution between 0 and the maximum random access delay factor.

According to an example of the present disclosure, under a second situation, the random access backoff time parameter information is the random access delay factor sequence associated with the service levels of different UEs in the cell, the random access delay factor sequence may be presented as $T_1, T_2, T_{i-1}, T_i \ldots T_M$, in which M is the total number of the service levels, $T_i$ is a maximum random access delay factor of the i-th service level, and $T_i$ is a minimum random access delay factor of the (i+1)-th service level. In this case, the information field of the spectrum handover command may be shown as in Table 2.

TABLE 2

| information field | the number of bits of the information |
|---|---|
| the target working frequency | n1 bit |
| radio resource configuration information of the target working frequency | n2 bit |
| a maximum random access delay factor $T_1$ associated with first-type UE | n3 bit |
| a maximum random access delay factor $T_2$ associated with second-type UE | n3 bit |
| ... | ... |
| a maximum random access delay factor $T_M$ associated with M-type UE | n3 bit |

According to an example of the present disclosure, when the random access backoff time parameter information is the random access delay factor sequence associated with the service levels of different UEs in the cell, the base station device may negotiate a mapping table between a service type and a service level with the UE.

According to an example of the present disclosure, the base station device may negotiate the mapping table between the service type and the service level with the UE by way of statically defining by a protocol. Alternatively, according to another example of the present disclosure, the base station device may negotiate the mapping table between the service type and the service level with the UE by way of dynamic configuration. In this case, the base station device may determine the mapping table between the service type and the service level, and may send the mapping table to the UE through system information or dedicated signaling.

Based on the mapping table between the service type and the service level, when the random access backoff time parameter information is the random access delay factor sequence associated with the service levels of different UEs in the cell, the UE may determine the random access backoff time using the random access backoff time parameter information according to a way described as follows. The UE may determine a service level i of the UE (assuming the service type of the UE belongs to the i-th service level) according to the mapping table between the service type and the service level and a current service type of the UE. The UE may randomly select the random access backoff time according to a uniform distribution between $T_{i-1}$ and $T_i$.

It should be noted that for a service type of which the service level is 1, the UE may randomly select the random access backoff time according to a uniform distribution between $T_0$ and $T_1$, in which $T_0$ is configured as 0 by default. In other words, the UE may randomly select the random access backoff time according to a uniform distribution between 0 to $T_1$ (which is carried in the spectrum handover command).

According to an example of the present disclosure, for the mapping table between the service type and the service level in a LTE system, a mapping relationship between the service level and a Quality of Service (QoS) Class Identifier (QCI) may be established. In this case, a mapping principle may be described as follows. One UE service level may be associated with multiple QCIs, while one QCI may be associated with one UE service level. The smaller a value of the UE service level is, the higher the UE service level is.

In view of the above, various examples of the present disclosure at least have following advantages compared with the prior art.

In the prior art, a method for solving the random access conflict is described as follows. When the base station device detects that the random access conflict occurs between UEs, a random backoff parameter is carried in the random access response message. The UEs between which the random access conflict has already occurred are dispersed in time to avoid the random access conflict continuously occurring between the UEs during a subsequent random access procedure, so that the base station device may perform conflict suppression after the base station device detects that the random access conflict occurs between the UEs. In the prior art, the first random access conflict on the target working frequency cannot be avoided and there is a higher requirement for the base station device to detect the random access conflict, which increases the delay and the failure probability of the random access and thus results in a higher failure probability of the spectrum handover and long service interruption time. Moreover, users at different service levels could not be processed distinguishingly, which influences the user experience of the CR system.

Various examples of the present disclosure describe a spectrum handover method for suppressing the random access conflict in the CR system. According to the method, the random access backoff time parameter information is carried in the spectrum handover command, so that the random access conflict is suppressed during the spectrum handover procedure of the CR system. A large number of UEs that intensively perform the random access on the target working frequency are pre-dispersed in time, rather than performing, by the base station device, the conflict suppression after the base station device detects the random access conflict. As such, the delay and the failure probability of the random access on the target working frequency during the spectrum handover procedure can be reduced, and thus the failure probability of the spectrum handover and the service interruption time can be reduced, so that the user experience of the CR system can be improved. In addition, by providing random backoff modes based on different service levels, the service interruption time of a user with a higher priority is reduced during the spectrum handover procedure, and thus the user experience of the user with the higher priority in the CR system is further improved.

Figure 3:
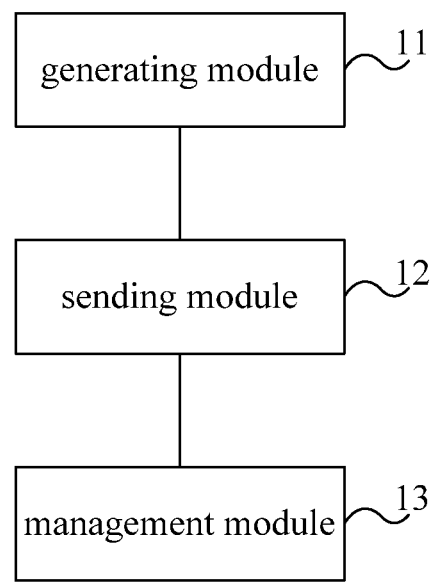
FIG. 3 is a schematic diagram illustrating a structure of a base station device, according to a second example of the present disclosure.

Based on the same concept of the method described above, various examples of the present disclosure also describe a base station device. As shown in FIG. 3, the base station device may include:

a generating module 11, configured to generate a spectrum handover command, in which the spectrum handover command may include random access backoff time parameter information; and a sending module 12, configured to send the spectrum handover command to a UE within a cell, so as to instruct the UE to initiate, during a spectrum handover procedure, a random access procedure using the random access backoff time parameter information.

According to an example of the present disclosure, the random access backoff time parameter information may include a maximum random access delay factor applied to all of UEs in the cell, or, a random access delay factor sequence associated with service levels of different UEs in the cell. According to an example of the present disclosure, the random access delay factor sequence may be presented as $T_1, T_2, T_{i-1}, T_i \ldots T_M$, in which M is the total number of the service levels, $T_i$ is a maximum random access delay factor of the i-th service level, and $T_i$ is a minimum random access delay factor of the (i+1)-th service level.

According to an example of the present disclosure, when the random access backoff time parameter information is the random access delay factor sequence associated with the service levels of different UEs in the cell, the base station device may further include a management module 13, configured to negotiate a mapping table between a service type and a service level with the UE.

According to an example of the present disclosure, the management module 13 may negotiate the mapping table between the service type and the service level with the UE by way of statically defining by a protocol. Alternatively, according to another example of the present disclosure, the management module 13 may determine the mapping table between the service type and the service level, and may send the mapping table to the UE through system information or dedicated signaling.

The above-mentioned modules described in various examples of the present disclosure may be deployed either in a centralized or a distributed configuration; and may be either merged into a single module, or further split into a plurality of sub-modules.

Figure 4:
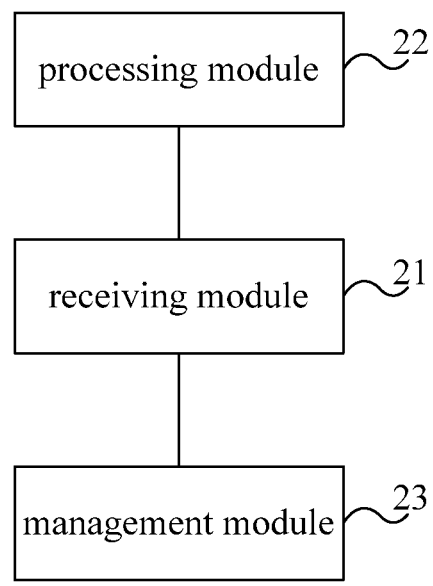
FIG. 4 is a schematic diagram illustrating a structure of a UE device, according to a third example of the present disclosure.

Based on the same concept of the method described above, various examples of the present disclosure also describe a UE. As shown in FIG. 4, the UE may include:

a receiving module 21, configured to receive a spectrum handover command sent from a base station device, in which the spectrum handover command may include random access backoff time parameter information; and a processing module 22, configured to initiate, during a spectrum handover procedure, a random access procedure using the random access backoff time parameter information.

According to an example of the present disclosure, the processing module 22 may determine random access backoff time using the random access backoff time parameter information, and may initiate the random access procedure after the random access backoff time.

According to an example of the present disclosure, when the spectrum handover command is received from the base station device, the processing module 22 may further perform downlink synchronization with a target working frequency. When the downlink synchronization with the target working frequency is completed, the processing module 22 may determine the random access backoff time using the random access backoff time parameter information. When the random access backoff time is determined, the processing module 22 may initiate the random access procedure after the random access backoff time. Alternatively, according to another example of the present disclosure, when the spectrum handover command is received from the base station device, the processing module 22 may determine the random access backoff time using the random access backoff time parameter information. When the random access backoff time is determined, the processing module 22 may perform the downlink synchronization with the target working frequency. When the downlink synchronization with the target working frequency is completed, the processing module 22 may initiate the random access procedure after the random access backoff time.

According to an example of the present disclosure, the random access backoff time parameter information may include a maximum random access delay factor applied to all of UEs in the cell, or, a random access delay factor sequence associated with service levels of different UEs in the cell. According to an example of the present disclosure, the random access delay factor sequence may be presented as $T_1, T_2, T_{i-1}, T_i \ldots T_M$, in which M is the total number of the service levels, $T_i$ is a maximum random access delay factor of the i-th service level, and $T_i$ is a minimum random access delay factor of the (i+1)-th service level.

According to an example of the present disclosure, when the random access backoff time parameter information is the maximum random access delay factor applied to all of the UEs in the cell, the processing module 22 may further randomly select the random access backoff time according to a uniform distribution between 0 and the maximum random access delay factor.

According to an example of the present disclosure, when the random access backoff time parameter information is the random access delay factor sequence associated with the service levels of different UEs in the cell, the UE may further include a management module 23, configured to negotiate a mapping table between a service type and a service level with the base station device.

According to an example of the present disclosure, the management module 23 may negotiate the mapping table between the service type and the service level with the base station device by way of statically defining by a protocol. Alternatively, according to another example of the present disclosure, when the base station device determines the mapping table between the service type and the service level, the management module 23 may receive the mapping table sent by the base station device through system information or dedicated signaling.

According to an example of the present disclosure, the processing module 22 may further determine a service level i of the UE according to the mapping table between the service type and the service level and a current service type of the UE. The processing module 22 may randomly select the random access backoff time according to a uniform distribution between $T_{i-1}$ and $T_i$.

The above-mentioned modules described in various examples of the present disclosure may be deployed either in a centralized or a distributed configuration; and may be either merged into a single module, or further split into a plurality of sub-modules.

According to the description of the above examples, it can be clearly understood by those skilled in the art that the examples of the present disclosure can be implemented by software accompanying with necessary general hardware platforms, or by hardware. Based on this, the essential parts of the technical solution mentioned above or the part contributed to the prior art can be presented in the form of a software product. The software product may be stored in a storage medium, and includes a plurality of machine-readable instructions for making a computer device (which can be a personal computer, a server, or a network device) implement methods recited in the examples of the present disclosure.

The figures are only illustrations of examples, in which the modules or procedures shown in the figures may not be necessarily essential for implementing the present disclosure.

Those skilled in the art can understand the modules in the apparatus of example embodiments of the present disclosure may be located in the apparatus as described in the example embodiments, or may be located in one or more apparatuses of the example embodiments of the present disclosure when modified accordingly. The modules in examples of the present disclosure may be combined into one module, or may be further divided into multiple sub-modules.

The number of the examples of the present disclosure is offered for an illustrative purpose and is not intended and should not be construed to indicate pros and cons. of the examples.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A random access method in a cognitive radio system, comprising:
   generating, by a base station device, a spectrum handover command, wherein the spectrum handover command comprises random access backoff time parameter information; and
   sending, by the base station device, the spectrum handover command to a user equipment in a cell to instruct the UE to initiate, during a spectrum handover procedure, a random access procedure using the random access backoff time parameter information;
   wherein the random access backoff time information comprises:
   a random access delay factor sequence associated with service levels of different UEs in the cell, and
   wherein the random access delay factor sequence is presented as T1, T2, Ti−1, Ti . . . TM, wherein M is the total number of the service levels T is a maximum random access delay factor of the i-th service level, and Ti is a minimum random access delay factor of the (i+1)-th service level.

2. The method of claim 1, wherein when the random access backoff time parameter information is the random access delay factor sequence associated with the service levels of different UEs in the cell, before the operation of sending, by the base station device, the spectrum handover command to the UE in the cell, the method further comprises:
   negotiating, by the base station device, a mapping table between a service type and a service level with the UE.

3. A random access method in a cognitive radio system, comprising:
   receiving, by a user equipment, a spectrum handover command sent from a base station device,
   wherein the spectrum handover command comprises random access backoff time parameter information; and initiating, by the UE during a spectrum handover procedure, a random access procedure using the random access backoff time parameter information;

wherein the random access backoff time parameter information comprises:

a random access delay factor sequence associated with service levels of different UEs in the cell, and wherein the random access delay factor sequence is presented as T1, T2, Ti−1, Ti . . . TM, wherein M is the total number of the service levels, Ti is a maximum random access delay factor of the i-th service level, and Ti is a minimum random access delay factor of the (i+1)-th service level.

4. The method of claim 3, wherein the operation of initiating, by the UE, the random access procedure using the random access backoff time parameter information comprises:

determining, by the UE, random access backoff time using the random access backoff time parameter information; and initiating the random access procedure after the random access backoff time.

5. The method of claim 4, wherein the operation of determining, by the UE, the random access backoff time using the random access backoff time parameter information and initiating the random access procedure after the random access backoff time comprises:

when the spectrum handover command is received from the base station device, performing, by the UE, downlink synchronization with a target working frequency;

when the downlink synchronization with the target working frequency is completed, determining the random access backoff time using the random access backoff time parameter information; and when the random access backoff time is determined, initiating the random access procedure after the random access backoff time; or, when the spectrum handover command is received from the base station device, determining, by the UE, the random access backoff time using the random access backoff time parameter information;

when the random access backoff time is determined, performing the downlink synchronization with the target working frequency; and when the downlink synchronization with the target working frequency is completed, initiating the random access procedure after the random access backoff time.

6. The method of claim 4, wherein when the random access backoff time parameter information is the random access delay factor sequence associated with the service levels of different UEs in the cell, before the operation of determining, by the UE, the random access backoff time using the random access backoff time parameter information, the method further comprises:

negotiating, by the UE, a mapping table between a service type and a service level with the base station device.

7. The method of claim 6, wherein the operation of determining, by the UE, the random access backoff time using the random access backoff time parameter information comprises:

determining, by the UE, a service level i of the UE according to the mapping table and a current service type of the UE; and randomly selecting, by the UE, the random access backoff time according to a uniform distribution between Ti−1 and Ti.

8. A base station device, comprising:

a processor and a memory, wherein the memory is configured to store one or more modules to be executed by the processor, and the one or more modules include:

a generating module, to generate a spectrum handover command;

wherein the spectrum handover command comprises random access backoff time parameter information; and a sending module, to send the spectrum handover command to a user equipment (UE) in a cell to instruct the UE to initiate, during a spectrum handover procedure, a random access procedure using the random access backoff time parameter information;

wherein the random access backoff time parameter information comprises:

a random access delay factor sequence associated with service levels of different UEs in the cell, and wherein the random access delay factor sequence is presented as T1, T2, Ti−1, Ti . . . TM, wherein M is the total number of the service levels, Ti is a maximum random access delay factor of the i-th service level, and Ti is a minimum random access delay factor of the (i+1)-th service level.

9. The base station device of claim 8, wherein when the random access backoff time parameter information is the random access delay factor sequence associated with the service levels of different UEs in the cell, the base station device further comprises:

a management module, to negotiate a mapping table between a service type and a service level with the UE.

10. A user equipment, comprising:

a processor and a memory, wherein the memory is configured to store one or more modules to be executed by the processor, and the one or more modules include:

a receiving module, to receive a spectrum handover command sent from a base station device;

wherein the spectrum handover command comprises random access backoff time parameter information; and a processing module, to initiate, during a spectrum handover procedure, a random access procedure using the random access backoff time parameter information;

wherein the random access backoff time parameter information comprises:

a random access delay factor sequence associated with service levels of different UEs in the cell, and wherein the random access delay factor sequence is presented as T1, T2, Ti−1, Ti . . . TM, wherein M is the total number of the service levels, Ti is a maximum random access delay factor of the i-th service level, and Ti is a minimum random access delay factor of the (i+1)-th service level.

11. The UE of claim 10, wherein the processing module is to:

determine random access backoff time using the random access backoff time parameter information; and initiate the random access procedure after the random access backoff time.

12. The UE of claim 11, wherein the processing module is further to:

perform, when the spectrum handover command is received from the base station device, downlink synchronization with a target working frequency;

determine, when the downlink synchronization with the target working frequency is completed, the random access backoff time using the random access backoff time parameter information; and initiate, when the random access backoff time is determined, the random access procedure after the random access backoff time; or, determine, when the spectrum handover command is received from the base station device, the random access backoff time using the random access backoff time parameter information;

perform, when the random access backoff time is determined, the downlink synchronization with the target working frequency; and initiate, when the downlink synchronization with the target working frequency is completed, the random access procedure after the random access backoff time.

13. The UE of claim 11, wherein when the random access backoff time parameter information is the random access delay factor sequence associated with the service levels of different UEs in the cell, the UE further comprises:

a management module, to negotiate a mapping table between a service type and a service level with the base station device.

14. The UE of claim 13, wherein the processing module is further to:

determine a service level i of the UE according to the mapping table and a current service type of the UE; and randomly select the random access backoff time according to a uniform distribution between $T_{i-1}$ and $T_i$.

* * * * *